United States Patent
Hwang et al.

(10) Patent No.: US 9,565,604 B2
(45) Date of Patent: *Feb. 7, 2017

(54) STATION DEVICE AND WIRELESS COMMUNICATION METHOD THEREOF AND MOBILE DEVICE AND WIRELESS COMMUNICATION METHOD THEREOF

(71) Applicant: SAMSUNG ELECTRONICS CO., LTD., Gyeonggi-do (KR)

(72) Inventors: Sang-young Hwang, Suwon-si (KR); Moon-seok Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/449,778

(22) Filed: Aug. 1, 2014

(65) Prior Publication Data
US 2014/0341190 A1  Nov. 20, 2014

Related U.S. Application Data

(63) Continuation of application No. 13/172,451, filed on Jun. 29, 2011, now Pat. No. 8,830,958.

(30) Foreign Application Priority Data

Aug. 31, 2010 (KR) .................. 10-2010-0085109

(51) Int. Cl.
*H04W 36/08* (2009.01)
*H04W 36/00* (2009.01)
(Continued)

(52) U.S. Cl.
CPC ........ *H04W 36/08* (2013.01); *H04L 29/06095* (2013.01); *H04W 12/04* (2013.01);
(Continued)

(58) Field of Classification Search
CPC .... H04W 36/005; H04W 36/08; H04W 36/36; H04W 80/04; H04W 84/12; H04W 92/02; H04L 29/06095
See application file for complete search history.

(56) References Cited

U.S. PATENT DOCUMENTS

| 2005/0148326 A1 | 7/2005 | Nogowa et al. |
| 2007/0019598 A1* | 1/2007 | Prehofer ........... H04W 36/0055 370/338 |

(Continued)

FOREIGN PATENT DOCUMENTS

| EP | 1739894 A1 | 1/2007 |
| JP | 2003-333053 A | 11/2003 |
| WO | 2007062004 A2 | 5/2007 |

OTHER PUBLICATIONS

Communication issued on Dec. 2, 2011 by the European Patent Office in the counterpart European Patent Application No. 11177943.5.

(Continued)

*Primary Examiner* — Paul H Masur
(74) *Attorney, Agent, or Firm* — Sughrue Mion, PLLC

(57) ABSTRACT

A station device includes: a communication unit wirelessly communicating with a mobile device that forms a subnet with the station device; a user input unit that receives a user command input for terminating a connection with a first access point and connecting to a second access point; and a controller that controls the communication unit so as to transmit, to the mobile device, connection change information for changing a connection of the mobile device in response to the user command.

20 Claims, 8 Drawing Sheets

(51) Int. Cl.
    *H04W 84/12*     (2009.01)
    *H04L 29/06*     (2006.01)
    *H04W 80/04*     (2009.01)
    *H04W 12/04*     (2009.01)
    *H04W 36/36*     (2009.01)
    *H04W 92/20*     (2009.01)

(52) U.S. Cl.
    CPC ....... *H04W 36/0055* (2013.01); *H04W 80/04* (2013.01); *H04W 84/12* (2013.01); *H04W 36/36* (2013.01); *H04W 92/20* (2013.01)

(56) References Cited

U.S. PATENT DOCUMENTS

| | | |
|---|---|---|
| 2008/0076426 A1 | 3/2008 | Nam |
| 2010/0260144 A1 | 10/2010 | Jee et al. |
| 2011/0194407 A1 | 8/2011 | Ji et al. |
| 2011/0281517 A1 | 11/2011 | Ukkadam |
| 2011/0283333 A1 | 11/2011 | Ukkadam |

OTHER PUBLICATIONS

Teyeb O., et al., "Dynamic Relaying in 3GPP LTE-Advanced Networks" Eurasip Journal on Wireless Communications and Networking, Hindawi Publishing Corporaton, New York, NY, US, Jan. 1, 2009.

\* cited by examiner

STATION DEVICE AND WIRELESS COMMUNICATION METHOD THEREOF AND MOBILE DEVICE AND WIRELESS COMMUNICATION METHOD THEREOF

CROSS-REFERENCE TO RELATED APPLICATIONS

This application is a Continuation of U.S. patent application Ser. No. 13/172,451, filed on Jun. 29, 2011, now U.S. Pat. No. 8,830,958, issued on Sep. 9, 2014, which claims priority from Korean Patent Application No. 10-2010-0085109, filed on Aug. 31, 2010, in the Korean Intellectual Property Office, the disclosures of which are incorporated herein by reference in its entirety.

BACKGROUND

1. Field

Apparatuses and methods consistent with exemplary embodiments relate to a station device and a wireless communication method thereof, and a mobile device and a wireless communication method thereof, and more particularly, to a station device capable of wireless communication with another station device using an access point and a wireless communication method thereof, and a mobile device and a wireless communication method thereof.

2. Description of the Related Art

In recent years, there is an increasing demand for mobile devices, such as laptops, personal digital assistants (PDAs), etc. In accordance with this trend, a wireless local area network (LAN) using an access point is widely used in order to perform wireless communication via radio signals, infrared signals, etc.

In such a wireless LAN environment, an access point may be connected to a station device, such as a television (TV), and accordingly an Internet service provided from the access point may be used by the station device.

If the access point of the station device is changed, an access point for various devices connected to the station device needs to be changed so that the various devices connected to the station device can use the Internet service provided from the new access point.

Under the related art wireless LAN environment, however, even if the access point of the station device is changed, the access point for the various devices connected to the station device is not changed.

Moreover, in order for a user to change the access point for the various devices to an access point connected to the station device, the user has to search for a new access point to which the user wants to change and then change various settings for the new access point individually on the various devices.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a station device, which transmits information for automatically changing an access point of a mobile device connected to a station device when an access point of the station device is changed, and a wireless communication method thereof and a mobile device and a wireless communication method thereof.

According to an aspect of an exemplary embodiment, there is provided a wireless communication method of a station device connected to a first access point, the method including: forming, at a station device, a subnet with a mobile device; terminating, at the station device, the connection with the first access point and connecting to a second access point; and transmitting, to the mobile device, connection change information for changing the connection of the mobile device.

The connection change information may include at least one of information indicating a connection relationship between the station device and the second access point, information asking whether to establish a connection from the mobile device to the second access point, and network information of the second access point.

The method may further include receiving the network information of the second access point.

The transmitting may include: transmitting information asking whether to connect from the mobile device to the second access point; and upon receiving information requesting a connection between the mobile device and the second access point, transmitting the received information to the mobile device.

The network information of the second access point may include at least one of a network name, a security number, an authentication mode, an encryption type, and a Media Access Control (MAC) address.

In the transmitting operation, the network information of the second access point may be transmitted to the mobile device using a Universal Plug and Play (UPnP) protocol or Transmission Control Protocol/Internet Protocol (TCP/IP) protocol.

According to an aspect of another exemplary embodiment, there is provided a wireless communication method of a mobile device that forms a subnet with a station device, the method including: receiving connection change information for changing the connection of the mobile device; and terminating the connection with a first access point and automatically connecting to a second access point based on the connection change information, wherein the connection change information may include information indicating that the station device is connected to the second access point.

The connection change information may further include information asking whether to connect from the mobile device to the second access point or network information of the second access point.

The method may further include displaying a screen asking whether to connect from the mobile device to the second access point.

The method may further include: receiving a user command input requesting a connection from the mobile device to the second access point; and transmitting to the station device information requesting a connection between the mobile device and the second access point in response to the user command input.

The method may further include receiving the network information of the second access point from the station device.

The network information of the second access point may include at least one of a network name, a security number, an authentication mode, an encryption type, and an MAC address.

In the receiving operation, the network information of the second access point may be received using a UPnP protocol or TCP/IP protocol.

The mobile device may be a remote controller for controlling the station device.

According to an aspect of another exemplary embodiment, there is provided a station device connected to a first access point, the station device including: a communication unit wirelessly communicating with a mobile device that forms a subnet with the station device; a user input unit that receives a user command input for terminating the connection with a first access point and connecting to a second access point; and a controller that controls the communication unit so as to transmit, to the mobile device, connection change information for changing the connection of the mobile device in response to the user command.

The connection change information may include at least one of information indicating a connection relationship between the station device and the second access point, information asking whether to establish a connection from the mobile device to the second access point, and network information of the second access point.

The communication unit may receive the network information of the second access point.

The controller may control the communication unit so as to transmit information asking whether to connect from the mobile device to the second access point, and, upon receiving information requesting a connection between the mobile device and the second access point, transmit the received information to the mobile device.

The network information of the second access point may include at least one of a network name, a security number, an authentication mode, an encryption type, and an MAC address.

The communication unit may transmit the network information of the second access point to the mobile device using an UPnP protocol or TCP/IP protocol.

According to an aspect of another exemplary embodiment, there is provided a mobile device including: a communication interface unit communicating with a station device; and a controller that, upon receiving connection change information for changing the connection of the mobile device, controls the communication interface unit so as to terminate the connection with a first access point and automatically connect to a second access point based on the connection change information, wherein the connection change information may include information indicating that the station device is connected to the second access point.

The connection change information may further include information asking whether to connect from the mobile device to the second access point or network information of the second access point.

The mobile device may further include a display unit for displaying a screen asking whether to connect from the mobile device to the second access point.

The mobile device may further include a user interface unit that receives a user command input requesting a connection from the mobile device to the second access point, wherein the controller may control the communication interface unit so as to transmit, to the station device, information requesting a connection between the mobile device and the second access point in response to the user command input.

The communication interface unit may receive the network information of the second access point from the station device.

The network information of the second access point may include at least one of a network name, a security number, an authentication mode, an encryption type, and an MAC address.

The communication interface unit may receive the network information of the second access point using a UPnP protocol or TCP/IP protocol.

The mobile device may be a remote controller for controlling the station device.

According to an aspect of another exemplary embodiment, there is provided a wireless communication method of a wireless communication system, the method including: connecting a station device to a first access point and connecting the station device to a mobile device using the first access point to thus form a subnet of the station device, the first access point, and the mobile device; connecting the station device to a second access point which is not on the subnet; the station device transmitting, to the mobile device, connection change information for changing the connection of the mobile device; and upon receiving the connection change information, the mobile device terminating the connection with the first access point and automatically connecting to the second access point using the connection change information, whereby the station device, the second access point, and the mobile device form a new subnet.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Hereinafter, exemplary embodiments will be described in greater detail with reference to the accompanying drawings.

Figure 1:
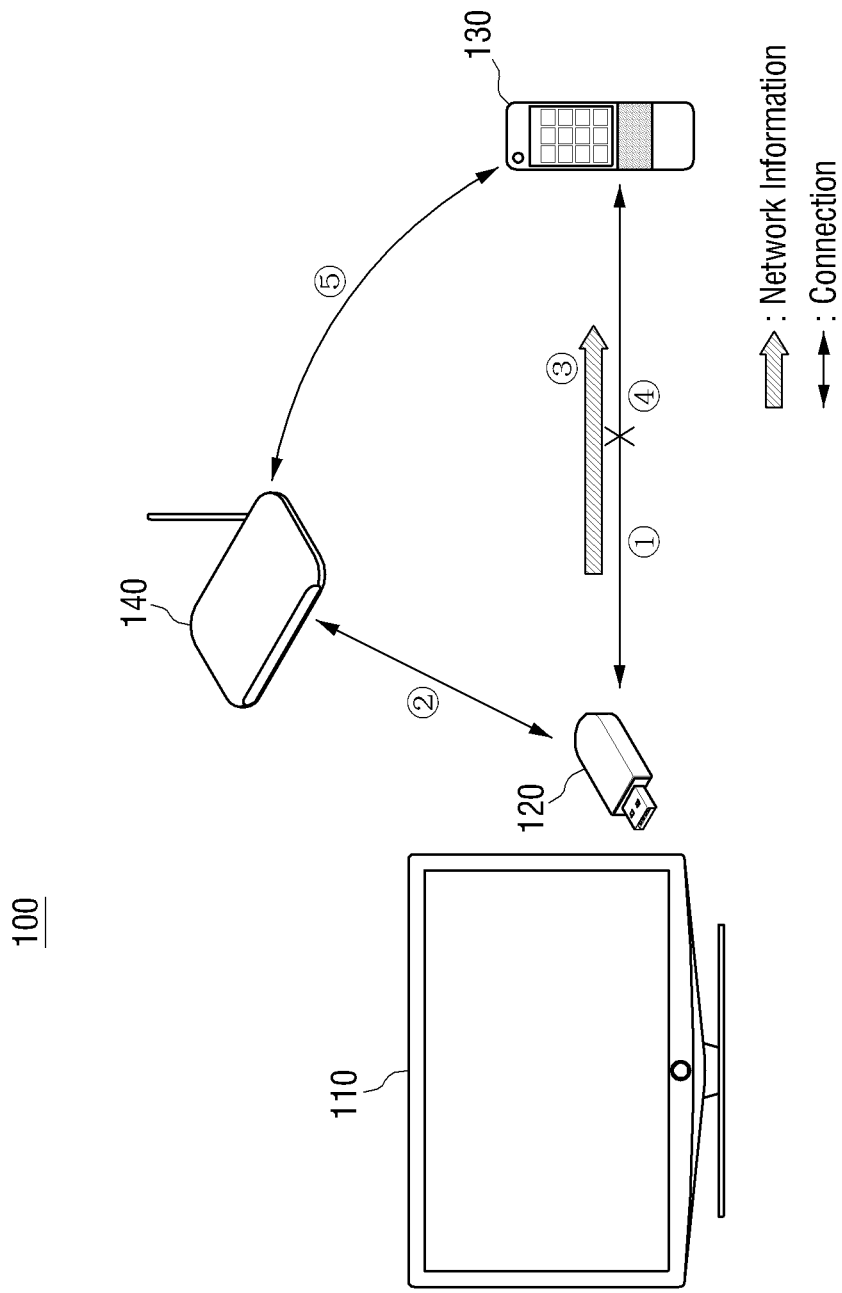
FIG. 1 is a view showing a wireless communication system according to an exemplary embodiment.

FIG. 1 is a view showing a wireless communication system according to an exemplary embodiment.

Referring to FIG. 1, the wireless communication system 100 includes a station device 110, a first access point 120, a mobile device 130, and a second access point 140.

First, an operation of the wireless communication system 100 according to an exemplary embodiment will be described.

The station device 110 is connected to the first access point 120. Specifically, the station device 110 may be automatically connected to the first access point 120 when the first access point 120 is attached to the station device 110, or may be connected to the first access point 120 by the execution of an application.

The first access point 120 may act as the station device 110 that can connect to another access point, as well as acting as an access point.

Although the first access point 120 is illustrated as being directly connected to the station device 110 as a universal serial bus (USB) stick, the first access point 120 may be included in the station device 110 or may be wirelessly connected to the station device 110. As such, the first access point 110 is not limited by the installation position, configuration, structure, etc. thereof.

The station device 110 may be connected to the mobile device 130 via the first access point 120.

In one example, the mobile device 130 may search for an access point around the mobile device 130 when an event, such as a user manipulation or the arrival of a preset time, occurs, and may display the searched access point on a user interface (UI) screen. In this case, the user can select the first access point 120 among at least one access point searched for and displayed on the UI screen, and hence the mobile device 130 can be connected to the station device 130 via the first access point 120.

Therefore, the station device 110, the first access point 120, and the mobile device 130 may form a single subnet.

When a user command for connecting the station device 110 to the second access point 140 is input into the station device 110, the station device 110 may terminate the connection with the first access point 120 and connect to the second access point 140.

In this case, too, the station device 110 may be connected to the second access point 140 by performing the aforementioned operation of the mobile device 130, such as searching for an access point around it.

On one hand, when the station device 110 is connected to the second access point 140, the second access point 140 may automatically transmit its network information to the station device 110, and the station device 110 may receive the network information transmitted from the second access point 140.

Alternatively, by searching for an access point around the station device 110, the station device 110 may acquire network information of the second access point 140 and store the acquired network information.

On the other hand, when the station device 110 is directly connected to the second access point 140, the station device 110 may automatically extract the network information of the second access point 140.

The station device 110 may transmit the network information of the second access point 140 to the mobile device 130.

The mobile device 130 may receive the network information of the second access point 140 transmitted from the station device 110.

Accordingly, the mobile device 130 and the station device 110 can share the network information of the second access point 140 to which the station device 110 is connected.

The mobile device 130 may terminate the connection with the first access point, and automatically connect to the second access point 140 using the network information of the second access point 140 received from the station device 110.

For convenience of explanation, the above description has been given for the case where the station device 110 transmits only the network information of the second access point 140 to the mobile device 130 and the mobile device 130 receives only the network information of the second access point 140 from the station device 110.

However, prior to or when transmitting the network information of the second access point 140 to the mobile device 130, the station device 110 may transmit to the mobile device 130 first information indicating that the access point of the station device 110 is changed from the first access point 120 to the second access point 140 and the station device 110 is currently connected to the second access point 140, and second information asking whether to connect to the second access point 140. Moreover, the mobile device 130 may receive the first information and the second information prior to or upon receiving the network information of the second access point 140.

Otherwise, the station device 110 may sequentially transmit the first information, second information, and network information of the second access point 140 to the mobile device.

The information transmitted from the station device 110 to the mobile device 130 is not limited to the aforementioned first information, second information, and network information of the second access point 140, and is not limited by the above sequence of transmission of information.

The first information, second information, and network information of the second access point 140 may be connection change information, where the information may be referred to as data or a packet.

Next, an operation of the wireless communication system 100 according to a modified exemplary embodiment will be discussed.

With the station device 110 being connected to the second access point 140 using the first access point 120 and having terminated the connection with the first access point 120, when the mobile device 130 is connected to the station device 110 using the first access point 120, the station device 110 may detect the connection of the mobile device 130 to the first access point 120 and transmit connection change information to the mobile device 130 to request the mobile device 130 to automatically change the connection from the first access point to the second access point.

Having received the connection change information from the station device 110, the mobile device 130 may automatically change the connection of the mobile device 130 from the first access point 120 to the second access point 140.

According to the above-described exemplary embodiments, since the access point of the mobile device 130 connected to the station device 110 may be automatically changed if the access point of the station device 110 is changed, the user is relieved of the inconvenience of changing the access point of the mobile device 130 individually.

The station device 110 may include a personal computer (PC), a TV, and so on.

The mobile device 120 may include a remote controller, a PDA, a mobile phone, a smart phone, a laptop, a tablet PC, and so on.

Figure 2:
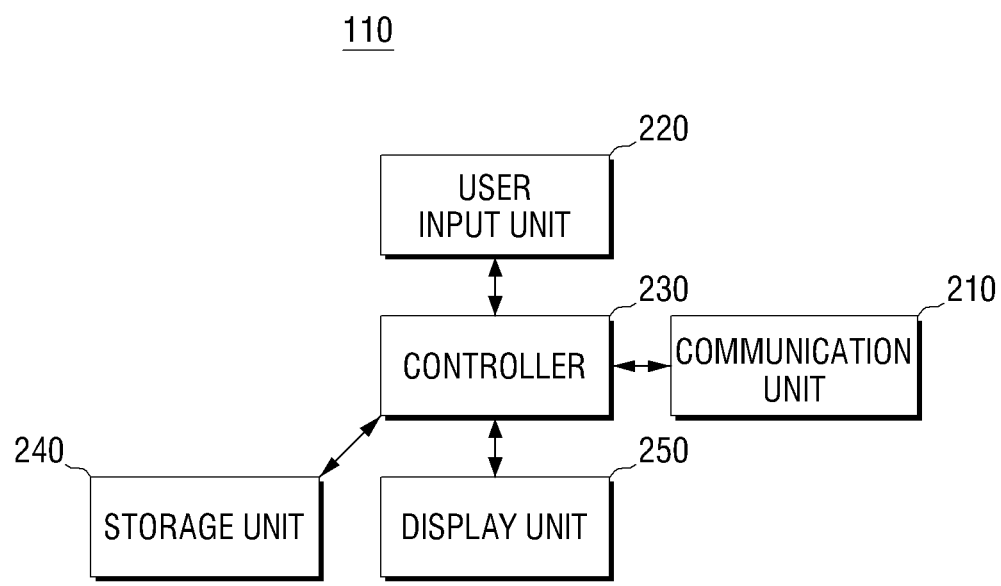
FIG. 2 is a view showing a station device according to an exemplary embodiment.

FIG. 2 is a view showing a station device according to an exemplary embodiment.

Referring to FIG. 2, the station device 110 comprises a communication unit 210, a user input unit 220, a controller 230, a storage unit 240, and a display unit 250.

The communication unit 210 wirelessly communicates with a mobile device 130 that forms a subnet with the station device 110. The communication unit 210 can communicate with a first access point 120 via, for example but not limited to, a USB interface, and communicate with the mobile device 130 and a second access point 140 via a network interface.

The communication unit 210 may receive a broadcast signal delivered from a broadcasting station, and receive an internet signal received from an access point.

The communication unit 210 receives network information of the second access point. In this case, the communication unit 210 may receive network information using a UPnP protocol or TCP/IP protocol.

Here, the network information of the second access point 140 may include at least one of network name, security number, authentication mode, encryption type, and MAC address that represent the second access point.

The user input unit 220 may terminate the connection with the first access point 120 and may receive a user command input for connecting to the second access point 140.

The controller 230 performs the overall control operations of the components 210, 220, 240, and 250. Specifically, the controller controls the communication unit 210 so as to transmit, to the mobile device 130, connection change information for changing the connection of the mobile device 130 in response to the user command.

The controller 230 transmits the information to the mobile device 130 asking whether to connect to the second access point 140, and, when the communication unit 210 receives the information requesting a connection between the mobile device 130 and the second access point 140, may control the communication unit 210 to transmit the received network information to the mobile device 130.

Here, the connection change information may include at least one of information indicating a connection relationship between the station device 110 and the second access point 140, information asking whether to establish a connection from the mobile device 130 to the second access point 120, and network information of the second access point 140.

The storage unit 240 stores the information indicating a connection relationship between the station device 110 and the second access point 120, the information asking whether to establish a connection from the mobile device 130 to the second access point 120, and the network information of the second access point 140. Moreover, the storage unit 240 may store various other kinds of information.

The display unit 250 may display an image. Specifically, the display unit 250 may receive a broadcast signal delivered from a broadcasting station and display an image corresponding to the received broadcast signal, or may receive an internet signal provided via an access point to be connected to the station device 110 and display an image corresponding to the received internet signal.

The display unit 250 may display a menu screen for changing access points.

In addition, the display unit 250 may display a connection state of an access point or of a device, such as the mobile device 130, to be connected to the station device 110.

Figure 3:
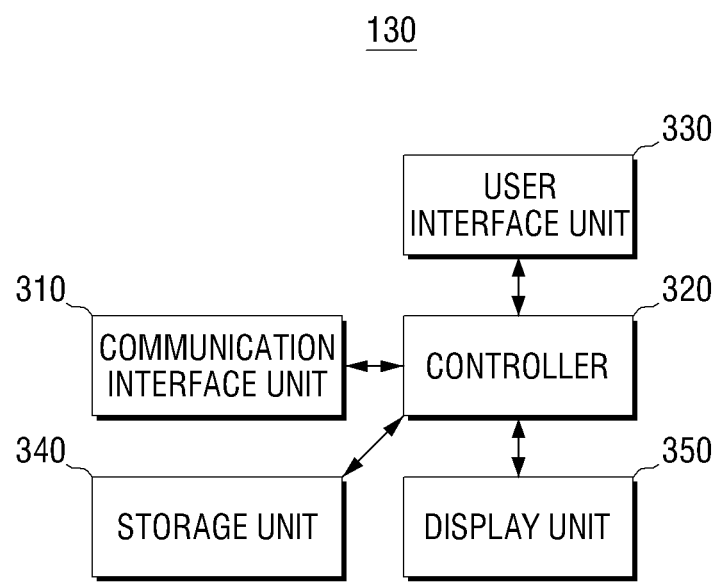
FIG. 3 is a view showing a mobile device according to an exemplary embodiment.

FIG. 3 is a view showing a mobile device according to an exemplary embodiment.

Referring to FIG. 3, the mobile device 130 comprises a communication interface unit 310, a controller 320, a user interface unit 330, a storage unit 340, and a display unit 350.

The mobile device 130 forms a subnet with a station device 110.

The mobile device 130 may be a remote controller for controlling the station device 110, but the type thereof is not limited thereto as mentioned above. In this case, the remote controller may generate a control signal for performing controls, for example but not limited to, channel change, volume change, and power on/off of the station device 110, and transmit the control signal to the station device 110 through, for example but not limited to, an infrared sending unit (not shown). Further, the remote controller may receive a broadcast signal from the station device 110 and display the received broadcast signal on a UI screen provided in one area of the remote controller.

The communication interface 310 communicates with the station device 110. Moreover, the communication interface unit 310 may communicate with various devices using, for example but not limited to, a network interface or USB interface.

The communication interface 310 may receive network information from the station device 110. In this case, the communication interface 310 may receive network information using a UPnP protocol or TCP/IP protocol.

The controller 320 performs the overall control operations of the components 310, 330, 340, and 350.

Upon receiving connection change information for changing the connection of the mobile device 130, the controller 320 may control the communication interface 310 to terminate the connection with the first access point 120 and automatically connect to the second access point 140 based on the received connection change information.

The controller 320 may control the communication interface unit 310 to transmit to the station device 110 information requesting a connection between the mobile device 130 and the second access point 120 in response to a user command input.

In this case, the connection change information may include information indicating that the station device 110 is connected to the second access point 140. The connection change information may further include information asking whether to establish a connection from the mobile device 130 to the second access point 140, and network information of the second access point 140.

The user interface unit 330 receives a user command input requesting a connection from the mobile device 130 to the second access point 140.

The storage unit 340 may store connection change information and various other kinds of information.

The display unit 350 may display an image corresponding to a broadcast signal or internet signal. The display unit 350 may display a screen asking whether to connect to the second access point 140.

Figure 4:
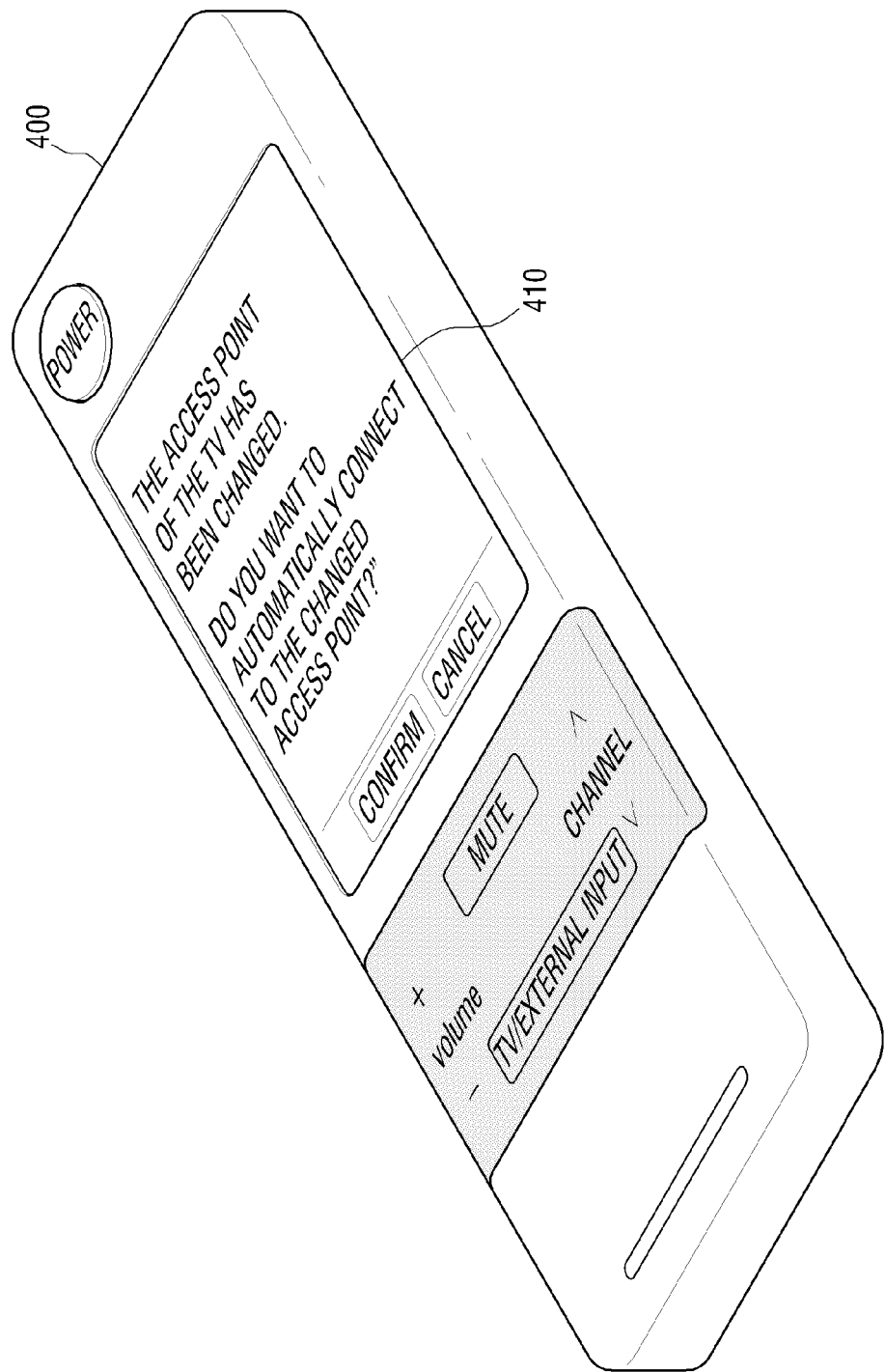
FIG. 4 is a view showing one example of a screen displayed on a mobile device according to an exemplary embodiment.

FIG. 4 is a view showing one example of a screen displayed on a mobile device according to an exemplary embodiment.

Referring to FIG. 4, the mobile device may be a remote control (remote controller) having a display screen.

If an access point connected to the station device 110 (for example, but not limited to, a television) is changed from the first access point 120 to the second access point 140, the mobile device 130 may receive, from the station device 110, information indicating that the access point is changed to the second access point 140.

Having received the information indicating a change of the access point, the mobile device 130 may receive and display a message saying "The access point of the TV has been changed. Do you want to automatically connect to the changed access point?" on the UI screen 410 of the mobile device 130.

Here, the UI screen 410 may comprise a user interface 330 and a display unit 350. The UI screen 410 may have a touch screen function.

When the user presses the confirm button, the access point of the mobile device 130 may be automatically changed to the second access point 140.

As discussed above, when the user presses the confirm button, the mobile device 130 receives network information of the second access point 140 to which the changes is made, and the mobile device 130 may automatically change the access point using the received network information.

Alternatively, the mobile device 130 may be configured not to display the UI screen 410 but to automatically connect to the changed access point each time the access point of the station device 110 is changed.

Figure 5:
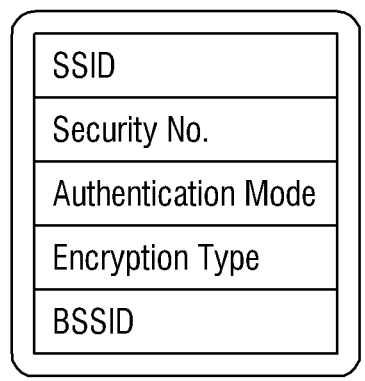
FIG. 5 is a view showing one example of network information according to an exemplary embodiment.

FIG. 5 is a view showing one example of network information according to an exemplary embodiment.

Referring to FIG. 5, network information of an access point may comprise a network name (SSID), a security number, an authentication mode, an encryption type, and an MAC address (BSSID).

The network name (SSID) is an identifier (ID) indicating the access point.

The security number is the password of the access point.

The authentication mode is an authentication mode, such as open system and shared key, that can be applied to the access point.

The encryption type indicates which algorithm is used to perform encryption on the access point. The access point may be encrypted using various algorithms, such as WPA-PSK (TKIP), WPA-PSK (AES), and WEP.

The MAC address (BSSID) indicates the MAC address of the access point represented by 12 digits.

Using such network information, the mobile device 130 may detect an access point to which the station device 110 is connected.

The network information shown in FIG. 5 is only an example, and not limited thereto.

Figure 6:
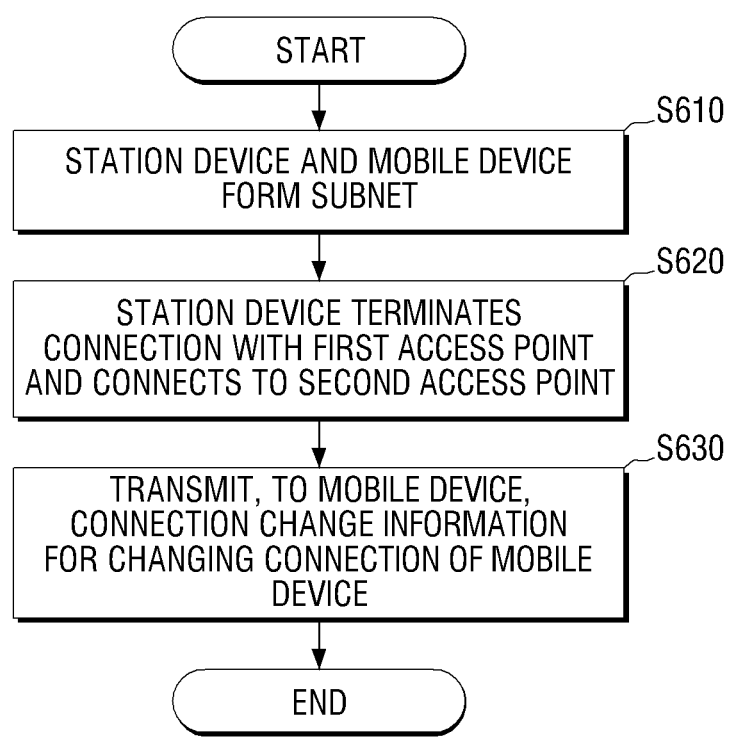
FIG. 6 is a flowchart for explaining a wireless communication method of a station device according to an exemplary embodiment.

FIG. 6 is a flowchart for explaining a wireless communication method of a station device according to an exemplary embodiment.

Referring to FIG. 6, in the wireless communication method of a station device, the station device 110 forms a subnet with a mobile device 130 (S610).

Next, the station device 110 terminates the connection with a first access point 120 and connects to a second access point 140 (S620).

Next, the station device 110 transmits, to the mobile device 130, connection change information for changing the connection of the mobile device 130 (S630).

The wireless communication method of the station device may further comprise receiving network information of the second access point 140 by the station device 110.

In addition, at S630, the station device 110 transmits, to the mobile device 130, information asking whether to connect from the mobile device 130 to the second access point 140, and, when the station device 110 receives information requesting a connection between the mobile device 130 and the second access point 140, transmits the received information to the mobile device 130.

The description of redundant portions will be omitted hereinbelow.

Figure 7:
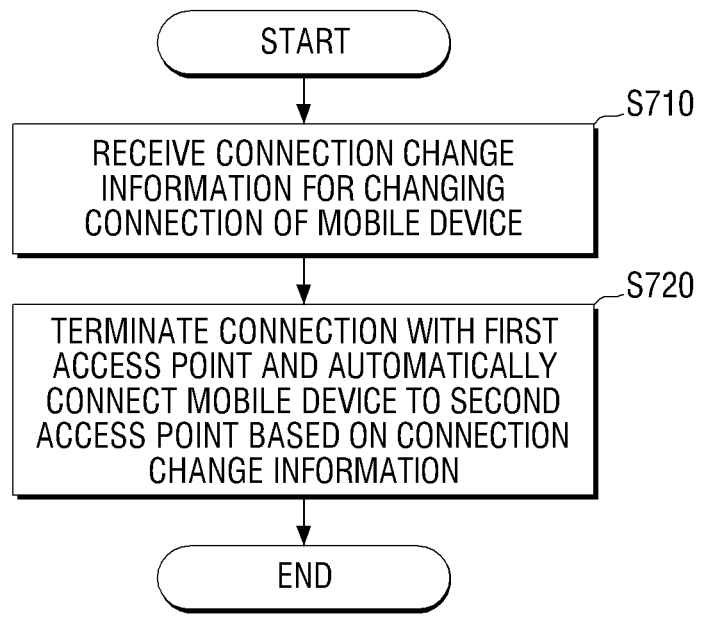
FIG. 7 is a flowchart for explaining a wireless communication method of a station device according to an exemplary embodiment.

FIG. 7 is a flowchart for explaining a wireless communication method of a station device according to an exemplary embodiment.

Referring to FIG. 7, in the wireless communication method of a station device, the mobile device 130 receives connection change information for changing the connection of the mobile device 130 (S710).

Based on the connection change information, the connection with a first access point 120 is terminated, and an automatic connection to a second access point 140 is established (S720).

In this case, the connection change information includes information indicating that the station device 110 is connected to the second access point 140.

The wireless communication method of the mobile device may further comprise asking whether to connect the mobile device 130 to the second access point 140.

In addition, in the wireless communication method of the mobile device, the mobile device 130 may receive a user command input requesting a connection from the mobile device 130 to the second access point 140, and transmit, to the station device 110, information requesting a connection between the mobile device 130 and the second access point 140.

The description of redundant portions will be omitted hereinbelow.

Figure 8:
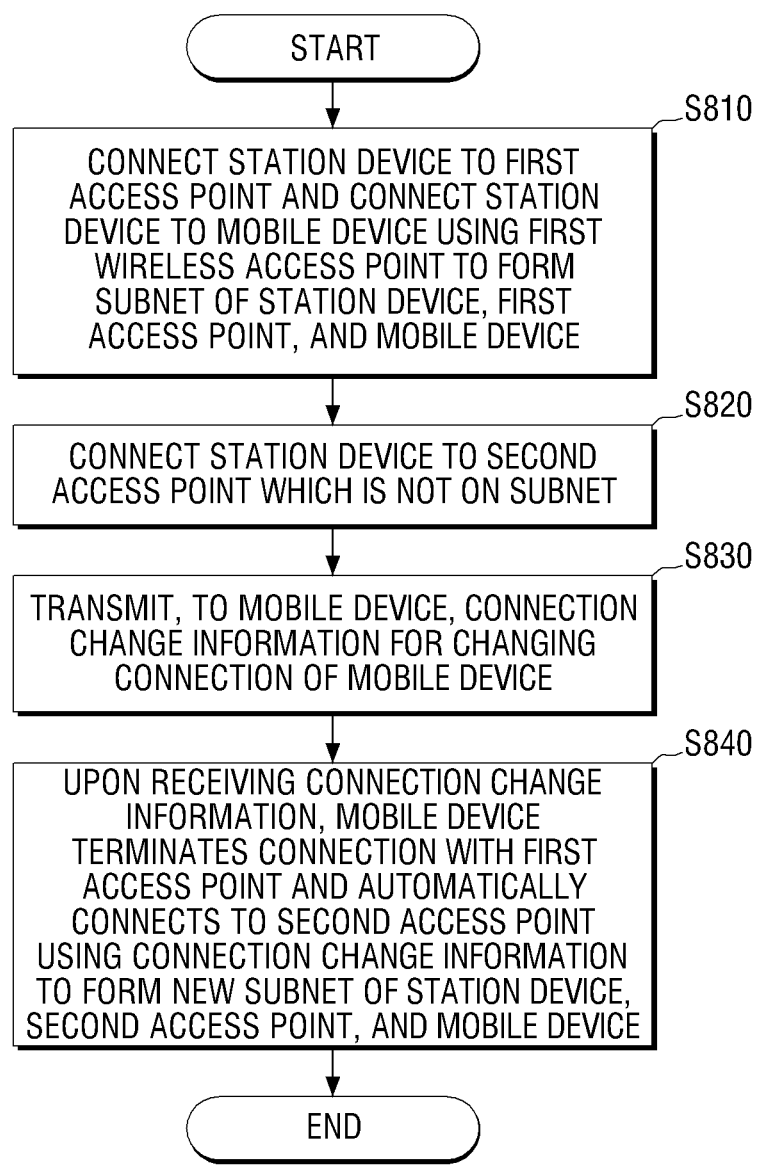
FIG. 8 is a flowchart for explaining a wireless communication method of a wireless communication system according to an exemplary embodiment.

FIG. 8 is a flowchart for explaining a wireless communication method of a wireless communication system according to an exemplary embodiment.

Referring to FIG. 8, in the wireless communication method of a wireless communication system, a station device 110 is connected to a first access point 120 and the station device 110 is connected to a mobile device 130 using the first wireless access point 120, whereby the station device 110, the first access point 120, and the mobile device 130 form a subnet (S810).

The station device 110 is connected to a second access point 140 which is not on the subnet (S820).

In this case, the station device 110 terminates the connection with the first access point 120, and the mobile device 130 still maintains the connection state with the station device 110 via the first access point 120.

The station device 110 transmits, to the mobile device 130, connection change information for changing the connection of the mobile device 130 (S830).

Upon receiving the connection change information, the mobile device 130 terminates the connection with the first access point 120, and automatically connects to the second access point 130 using the connection change information, whereby the station device 110, the second access point 140, and the mobile device 130 form a new subnet (S840).

If the mobile device 130 cannot connect to the second access point 140, the mobile device 130 maintains the connection state with the first access point 120.

The description of redundant portions will be omitted hereinbelow.

Although exemplary embodiments of the present inventive concept have been illustrated and described, those skilled in the art will appreciate that various changes may be made to the exemplary embodiments without departing from the technical spirit and scope of the present inventive concept. Also, the description of the exemplary embodiments is intended to be illustrative, and not to limit the scope of the claims, and many alternatives, modifications, and variations will be apparent to those skilled in the art.

What is claimed is:

1. A station device connected to a first access point, the station device comprising:
   a communication unit to establish a wireless communication with a mobile device through the first access point;
   a user input unit that receives a user command for connecting to a second access point; and a controller that controls the communication unit to transmit to the mobile device information for the mobile device to connect to the second access point, in response to the user command, and to reestablish a wireless communication with the mobile device through the second access point.

2. The station device of claim 1, wherein the information comprises at least one of information indicating a connection relationship between the station device and the second access point, information asking whether to establish a connection from the mobile device to the second access point, and network information of the second access point.

3. The station device of claim 2, wherein the communication unit transmits the network information of the second access point to the mobile device using a Universal Plug and Play (UPnP) protocol or a Transmission Control Protocol/Internet Protocol (TCP/IP) protocol.

4. The station device of claim 1, wherein the communication unit receives network information of the second access point.

5. The station device of claim 4, wherein the controller controls the communication unit to transmit information asking whether to connect from the mobile device to the second access point, and, upon receiving information requesting a connection between the mobile device and the second access point, transmit the received information to the mobile device.

6. The station device of claim 4, wherein the network information of the second access point comprises at least one of a network name, a security number, an authentication mode, an encryption type, and a Media Access Control (MAC) address.

7. A wireless communication method of a station device connected to a first access point, the wireless communication method comprising:
   establishing a wireless communication with a mobile device through the first access point;
   receiving a user command for connecting to a second access point; and
   transmitting, to the mobile device, information for the mobile device to connect to the second access point, in response to the user command, and reestablishing a wireless communication with the mobile device through the second access point.

8. The wireless communication method of claim 7, wherein the information comprises at least one of information indicating a connection relationship between the station device and the second access point, information asking whether to establish a connection from the mobile device to the second access point, and network information of the second access point.

9. The wireless communication method of claim 8, further comprising transmitting the network information of the second access point to the mobile device using a Universal Plug and Play (UPnP) protocol or a Transmission Control Protocol/Internet Protocol (TCP/IP) protocol.

10. The wireless communication method of claim 7, further comprising receiving network information of the second access point.

11. The wireless communication method claim 10, further comprising transmitting information asking whether to connect from the mobile device to the second access point, and, upon receiving information requesting a connection between the mobile device and the second access point, transmitting the received information to the mobile device.

12. The wireless communication method of claim 10, wherein the network information of the second access point comprises at least one of a network name, a security number, an authentication mode, an encryption type, and a Media Access Control (MAC) address.

13. A display apparatus comprising:
   a display;
   a communication interface configured to communicate with an external apparatus; and
   a controller configured to control the communication interface to establish a first type of wireless communication with a first external apparatus, and in response to receiving network information of a second external apparatus for connecting to the second external apparatus from a third apparatus through a second type of wireless communication with the third apparatus while the first type of wireless communication with the first external apparatus is established, to terminate the first type of wireless communication with the first external apparatus and to establish the first type of wireless communication with the second external apparatus based on the network information of the second external apparatus received from the third apparatus.

14. The display apparatus of claim 13, wherein the third apparatus obtains the network information of the second external apparatus from the second external apparatus through a wireless communication with the second external apparatus.

15. The display apparatus of claim 13, wherein the third apparatus transmits the network information of the second external apparatus to the display apparatus when the second type of wireless communication between the third apparatus and the second external apparatus is established.

16. The display apparatus of claim 13, wherein the third apparatus transmits the network information of the second external apparatus to the display apparatus when the third apparatus receives defined information from the second external apparatus.

17. The display apparatus of claim 13, wherein the controller of the display apparatus receives the network information of the second external apparatus from the third apparatus via the first external apparatus.

18. The display apparatus of claim 13, wherein the network information of the second external apparatus includes at least one of a network name, a security number, an authentication mode, an encryption type, and a Media Access Control (MAC) address.

19. The display apparatus of claim 13, wherein the network information is a Media Access Control (MAC) address of the second external apparatus.

20. The display apparatus of claim 19, wherein the second type of wireless communication is one among a Universal Plug and Play (UPnP) protocol and Transmission Control Protocol/Internet Protocol (TCP/IP) protocol.

* * * * *